United States Patent
Campbell

(10) Patent No.: US 6,487,284 B1
(45) Date of Patent: Nov. 26, 2002

(54) CARD PAY TELEPHONE WITH SPEED DIALING

(75) Inventor: David N. Campbell, Carlisle, MA (US)

(73) Assignee: Verizon Laboratories Inc., Waltham, MA (US)

(*) Notice: Subject to any disclaimer, the term of this patent is extended or adjusted under 35 U.S.C. 154(b) by 0 days.

(21) Appl. No.: 09/351,615

(22) Filed: Jul. 12, 1999

(51) Int. Cl.$^7$ .................................. H04M 17/00
(52) U.S. Cl. .................. 379/144.04; 379/114.15; 379/114.2; 379/114.19; 379/355.1; 379/357.01; 235/493
(58) Field of Search ................... 379/143, 144, 379/155, 280, 285, 352, 355, 356, 357, 88.01, 88.02, 88.03, 88.08, 88.27; 235/487, 493

(56) References Cited

U.S. PATENT DOCUMENTS

| | | | |
|---|---|---|---|
| 3,657,481 A | 4/1972 | Di Massimo | 179/6.3 R |
| 4,439,636 A | 3/1984 | Newkirk et al. | 179/7.1 R |
| 4,731,818 A | 3/1988 | Clark, Jr. et al. | 379/144 |
| 4,879,744 A | * 11/1989 | Tasaki et al. | 379/144 |
| 4,899,373 A | * 2/1990 | Lee et al. | 379/207 |
| 4,975,942 A | 12/1990 | Zebryk | 379/144 |
| 5,546,446 A | * 8/1996 | Tsunokawa et al. | 379/114 |
| 5,572,005 A | * 11/1996 | Hamilton et al. | 235/381 |
| 5,734,702 A | * 3/1998 | Sugimura | 379/88 |
| 5,953,398 A | * 9/1999 | Hill | 379/112 |
| 6,075,860 A | * 6/2000 | Ketcham | 380/25 |
| 6,160,997 A | * 12/2000 | Oberlaender | 455/66 |

\* cited by examiner

Primary Examiner—Binh Tieu
(74) Attorney, Agent, or Firm—Leonard Charles Suchyta; James K. Weixel

(57) ABSTRACT

A pay telephone includes a keypad, a card reader, and a processor. The keypad receives input signals from a caller. The card reader reads identification data and speed dial numbers from a card received from the caller. The processor receives the input signals from the keypad and the identification data and speed dial numbers from the card reader, and concurrently validates the card using the identification data and initiates a telephone call using the input signals or the speed dial numbers.

41 Claims, 15 Drawing Sheets

CARD ISSUER'S WEB SITE
 REQUEST A CARD — 1105
 MEMBER LOG IN — 1110
FIG. 11A

CARD ISSUER'S WEB SITE

1100

- CHANGE PIN ~ 1115
- CHANGE MAILING ADDRESS ~ 1120
- REPORT LOST/STOLEN CARD ~ 1125
- CHANGE SPEED DIAL NUMBERS ~ 1130

FIG. 11B

ND DIALING

FIELD OF THE INVENTION

The present invention relates generally to public communication systems and, ore particularly, to a card pay telephone system with improved call throughput and speed dialing.

BACKGROUND OF THE INVENTION

Many conventional pay telephones accept credit card payments. These telephones typically fall into two categories: those requiring the caller to enter the credit card information into the telephone by pressing keys on the keypad and those that automatically read the information from the credit card. Telephones in the latter category usually include a magnetic card reader that reads the information encoded on a magnetic strip on the credit card, checks the validity of the information, and stores the information for use in establishing a telephone call.

When a caller desires to place a telephone call using the conventional telephone, the caller inserts a credit card into the card reader. The card reader reads the information from the card and typically sends this information to a local processor. The processor performs an initial check to determine whether the caller has inserted a proper unexpired credit card. If the credit card passes this initial check, the processor sends the credit card information to a remote central office to determine whether the credit card is among a list of invalid credit cards maintained in a database at the central office. Only after the central office returns a confirmation that the credit card is valid will the processor permit the telephone call to be sent through to its destination, thus, prolonging the telephone call process.

In addition, each time that the caller wishes to place a call the caller must enter the entire telephone number. If the caller misdials, the entire process must be repeated even for telephone numbers routinely dialed by the caller. This prolongs the telephone call process even further.

Some conventional telephone systems alleviate the requirement that a caller enter routinely dialed telephone numbers. These systems include an interactive voice response (IVR) unit that permits the caller to equate a vocal command with a telephone number. For example, the caller may say "Call Home" and the IVR unit equates "Home" with the telephone number for the caller's residence. These systems typically require, however, that the caller dial a specific telephone number and enter a code or interact with the IVR unit to provide some type of identifying information, still delaying the telephone call process.

As a result, a need exists to expedite the telephone call process on public telephone systems.

SUMMARY OF THE INVENTION

Systems and methods consistent with the present invention address this need to increase call throughput on a public telephone by expediting call placement and by providing speed dialing capability.

In accordance with the purpose of the invention as embodied and broadly described herein, a system consistent with the present invention includes a keypad, a card reader, and a processor. The keypad receives input signals from a caller. The card reader reads identification data and speed dial numbers from a card received from the caller. The processor receives the input signals from the keypad and the identification data and speed dial numbers from the card reader, and concurrently validates the card using the identification data and initiates a telephone call using the input signals or the speed dial numbers.

In accordance with another implementation consistent with the invention, a system includes an input unit, a card reader, a card writer, and a processing unit. The input unit receives input signals. The card reader reads speed dial numbers from a card. The card writer writes speed dial numbers onto a card. The processing unit identifies the input signals from the input unit, instructs the card writer to write at least one of the speed dial numbers onto the card when at least one of the input signals is identified as a first predetermined input signal, and initiates a telephone call using at least one of the speed dial numbers from the card reader when at least one of the input signals is identified as a second predetermined input signal.

In accordance with yet another implementation consistent with the present invention, an article of manufacture for use with a public telephone system includes computer usable code representing a type of card, computer usable code representing a card identifier, computer usable code representing an expiration date of the card, and computer usable code representing speed dial telephone numbers.

A further implementation consistent with the present invention includes a method for storing speed dial numbers on a credit card. The method includes receiving a log in request, receiving a request to store speed dial numbers on the credit card, providing a list of current speed dial numbers already stored on the credit card, receiving at least one of changes to the current speed dial numbers and new speed dial numbers to be stored on the card, and issuing a credit card having a memory that stores the speed dial number changes and the new speed dial numbers.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 11A–11C are diagrams of exemplary web pages of a card issuer.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide expedited call processing in a public telephone system by transmitting a call concurrently with checking the validity of the caller's payment and by offering speed dialing capability.

Exemplary Public Telephone System

Figure 1:
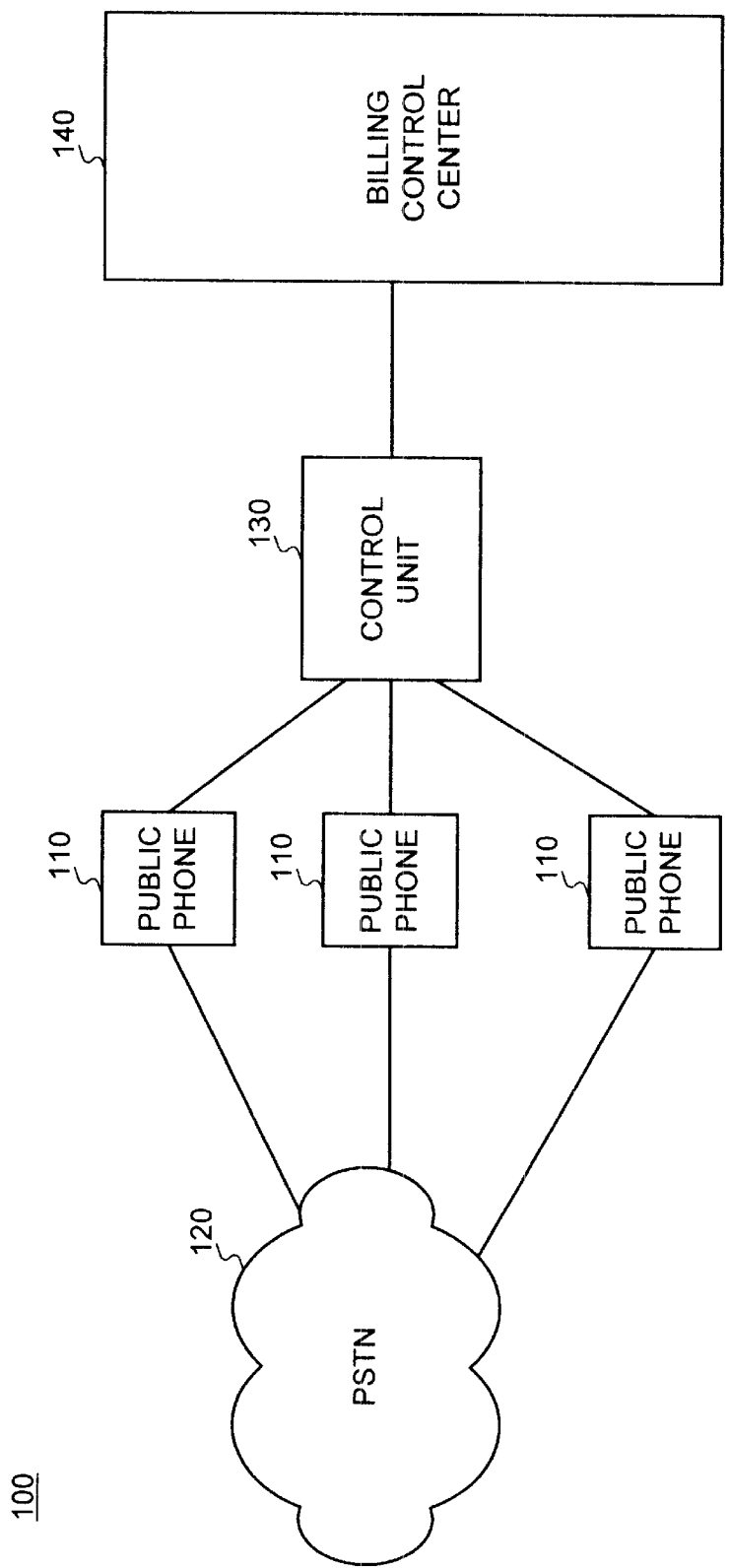
FIG. 1 is an exemplary diagram of a public telephone system consistent with the present invention.

FIG. 1 is an exemplary diagram of a public telephone system 100 consistent with the present invention. The telephone system 100 includes several public telephones 110 connected to communicate with telephone equipment over a public switched telephone network (PSTN) 120. The telephone system 100 also includes a control unit 130 and a billing control center 140.

The control unit 130 includes, for example, a personal computer, such as an IBM-compatible computer, that processes card information against a database of card information and acquires billing information. The control unit 130 connects to the public telephones 110 using high-speed data connections or other similar mechanisms, such as wireless communication mechanisms, or via the PSTN 120.

The billing control center 140 includes, for example, a computer, such as a personal computer or a larger mainframe computer. The billing control center 140 connects to the control unit 130 via a high-speed data connection, wireless communication mechanisms, or the PSTN 120 to obtain billing information to generate a bill for a telephone call.

In one alternative implementation, the public telephones 110 perform the operations of the control unit 130.

Exemplary Public Telephone with Card Reader/Writer

Figure 2:
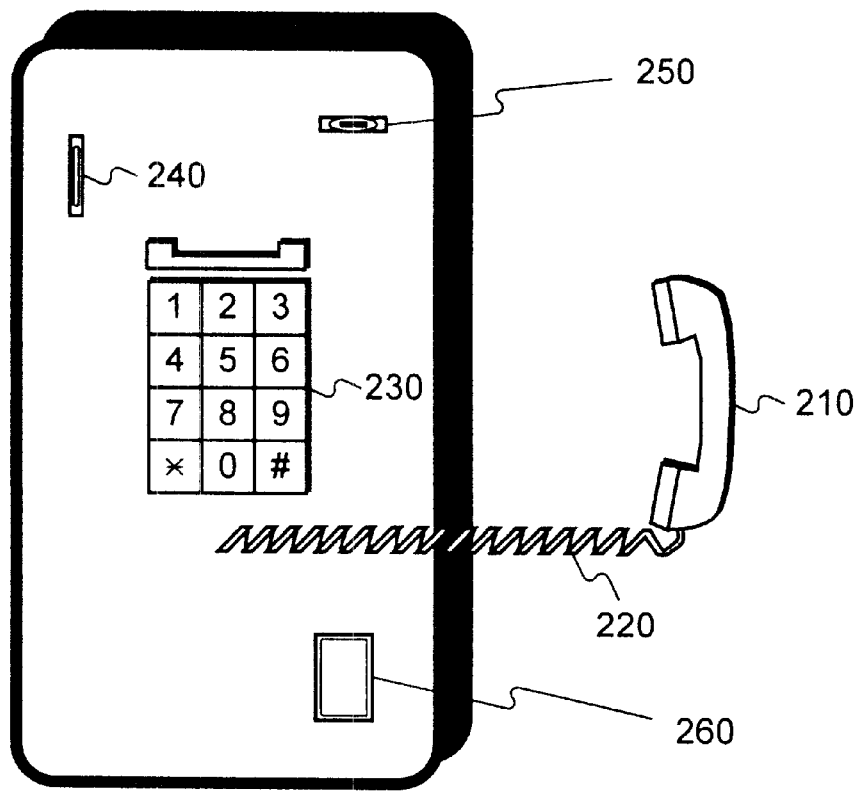
FIG. 2 is an exemplary diagram of a public telephone in the system of FIG. 1.

FIG. 2 is an exemplary diagram of the public telephone 110. The public telephone 110 includes a telephone handset 210 connected via a telephone cord or cable 220, a keypad 230, a card reception slot 240, a coin reception slot 250, and possibly a coin return slot 260. The telephone handset 210 contains standard equipment, such as a microphone and speaker for receiving audible communication from and transmitting audible communication to a caller. The keypad 230 includes a conventional telephone keypad for generating dual-tone multi-frequency (DTMF) tones corresponding to an entered telephone number and for controlling a function of the telephone 110.

The card reception slot 240 receives a card, such as a credit card, a debit card an integrated circuit (IC) card, or the like, from a caller as payment for a telephone call. The coin reception slot 250 receives coins from a caller as payment for a telephone call. The coin return slot 260 may return coins to the caller for incomplete placement of a telephone call.

Figure 3:
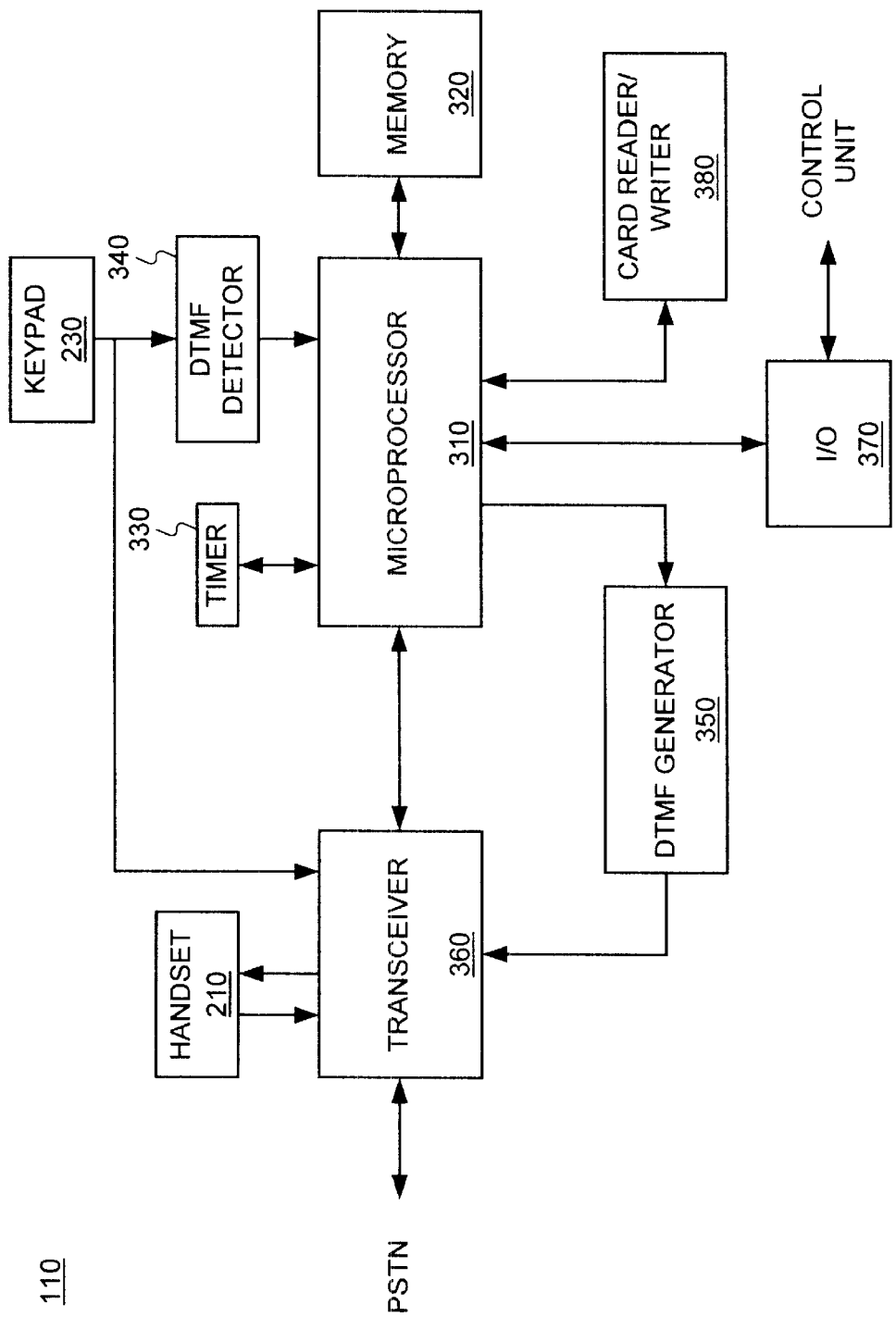
FIG. 3 is a detailed diagram, consistent with the present invention, of the public telephone of FIG. 2.

FIG. 3 is a detailed diagram of the public telephone 110 consistent with the present invention. The telephone 110 includes a microprocessor 310, a memory 320, a timer 330, a keypad 230, a DTMF detector 340, a handset 210, a DTMF generator 350, a transceiver 360, an input/output unit 370, and a card reader/writer 380.

The microprocessor 310 includes a conventional microprocessor or microcontroller that controls the operation of the telephone 110. The memory 320 includes a memory device, such as a random access memory (RAM) or an electrically-erasable programmable memory (EEPROM), that stores card data indicating, for example, types of cards accepted by the telephone 110. The timer 330 includes a conventional timing mechanism, such as a counter.

The keypad 230 is a conventional telephone keypad that generates DTMF signals corresponding to the keys pressed by a caller. The signals correspond to a telephone number dialed by the caller or control operations for execution by the microprocessor 310. The DTMF detector 340 translates DTMF signals from the keypad 230 into numeric data corresponding to the pressed keys and provides this information to the microprocessor 310. The DTMF generator 350, on the other hand, translates numeric data from the microprocessor 310 into corresponding DTMF signals.

The transceiver 360 includes a transmitter and a receiver that communicate with the PSTN 120. The transceiver 360 may also include a multiplexer having inputs connected to the keypad 230 and the DTMF generator 350 for transmitting DTMF signals representing a telephone number to the PSTN 120. In addition, the transceiver 360 connects to communicate audible signals with the handset 210.

The I/O unit 370 includes an interface between the microprocessor 310 and the control unit 130. The card reader/writer 380 includes a mechanism capable of reading data from and writing data to a card having, for example, a magnetic strip. Of course, the card may alternatively include other non-magnetic memory, such as optical or IC memories.

Figure 4:
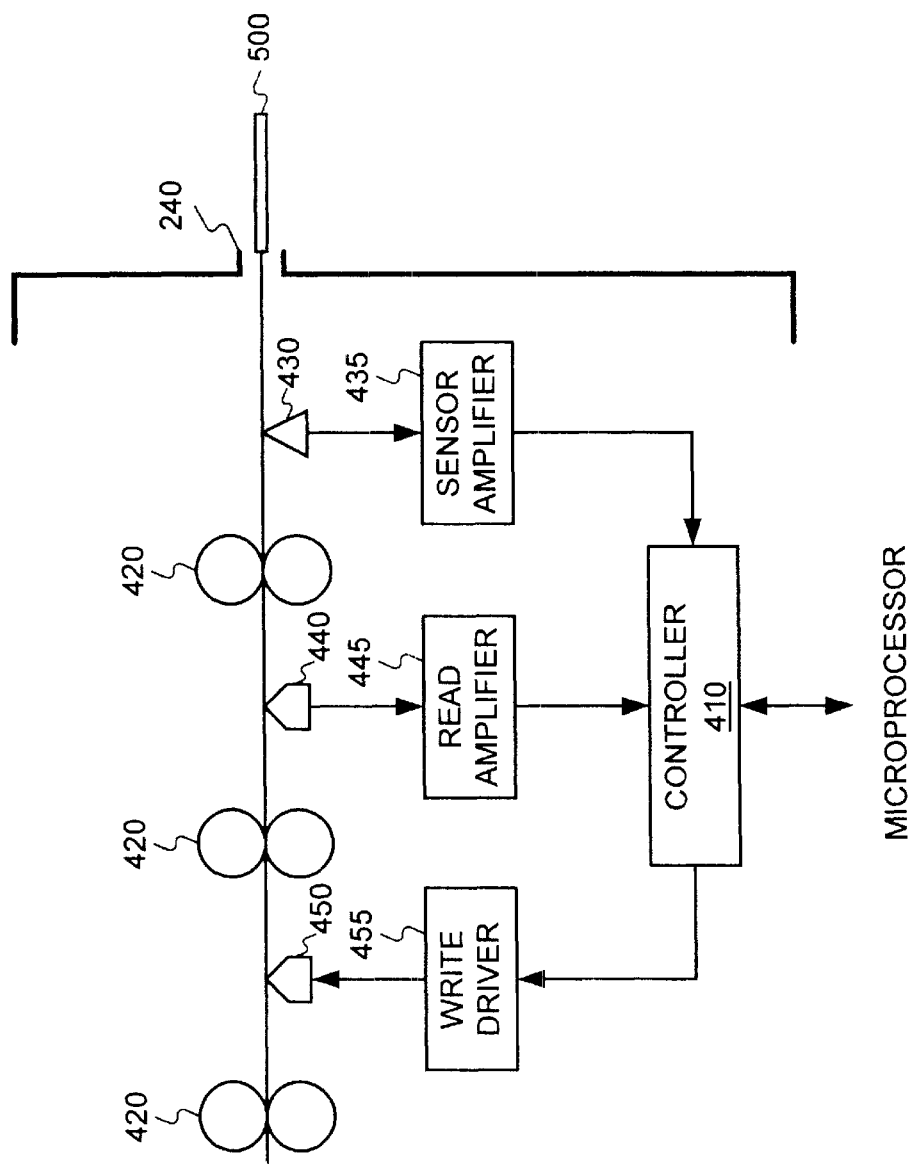
FIG. 4 is a detailed diagram of the card reader of FIG. 3.

FIG. 4 is an exemplary diagram of the card reader/writer 380 for use with a card containing a magnetic strip. The card reader/writer 380 includes a card reception slot 240, a controller 410, rollers 420, a card sensor 430, a sensor amplifier 435, a magnetic read head 440, a read amplifier 445, a magnetic write head 450, and a write driver 455. The controller 410 includes a microprocessor or microcontroller that controls the operation of the card reader/writer 380 and communicates with the microprocessor 310 (FIG. 3).

The card reception slot 240 receives a card, such as card 500, from a caller. In this implementation, the card 500 may be a credit card, a prepaid calling card, or a debit card. The rollers 420 grasp the card 500 to position it for reading and writing operations. The card sensor 430 detects the presence of a card received via the reception slot 240. The sensor amplifier 435 amplifies the signals output by the card sensor 430.

The read head 440 includes a conventional magnetic read head for reading data from a magnetic memory, such as the magnetic strip on a card. The read amplifier 445 amplifies the signals output by the read head 440. The write head 450 includes a conventional magnetic write head for writing data in a magnetic memory. The write driver 455 controls the writing performed by the write head 450. The write driver 455 operates under instructions from the controller 410.

A card reader/writer for use with cards having non-magnetic memories, such as optical or IC memories, would contain similar elements known to those skilled in the art. In addition, the card reader/writer may be implemented to exchange information with a card held in close proximity to the card reader/writer without requiring the card to be inserted therein.

Exemplary Card

Figure 5A:
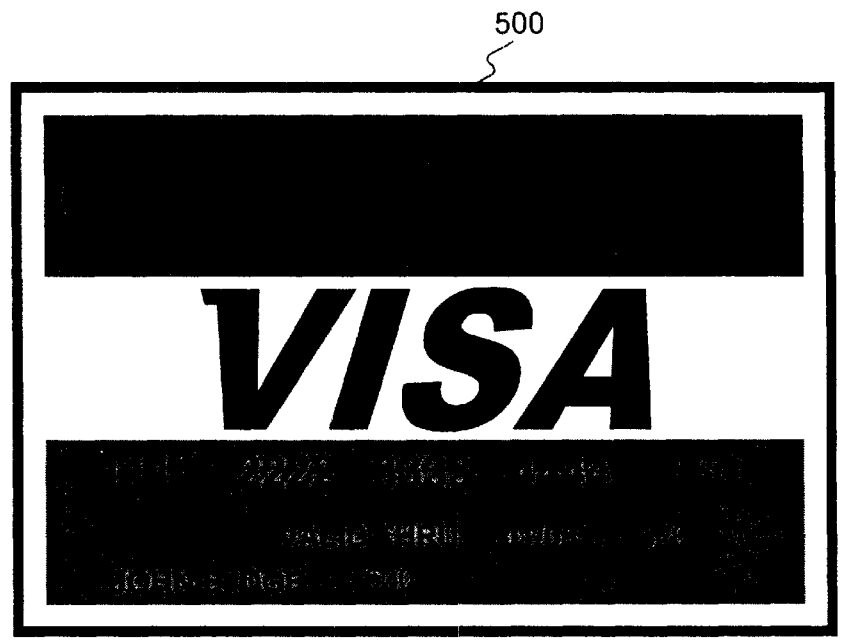
FIGS. 5A and 5B are exemplary front and rear diagrams, respectively, of a card consistent with the present invention.
Figure 5B:

FIGS. 5A and 5B are front and rear diagrams, respectively, of an exemplary card 500 consistent with the present invention. The front of the card 500 (FIG. 5A)

includes a credit card number 510, a card expiration date 520, and the card holder's name 530. The back of the card 500 (FIG. 5B) includes a magnetic strip 540 containing magnetically encoded information and an area 550 for the card holder's signature.

Figure 6A:
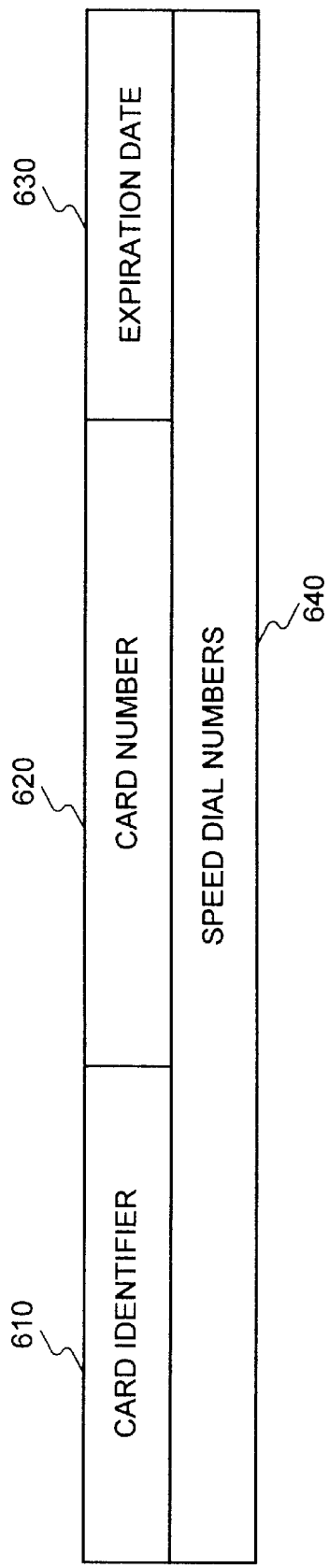
FIGS. 6A and 6B are exemplary diagrams of a memory of the card of FIGS. 5A and 5B.

FIG. 6A is an exemplary diagram of types of information, consistent with the present invention, encoded on the magnetic strip 540. The information includes a card identifier 610, a card number 620, an expiration date 630, and speed dial numbers 640.

The card identifier 610 includes data identifying the type of card, including, for example, whether the card is a Visa, MasterCard, American Express, etc. The card number 620 includes data reflecting the credit card number 510 (FIG. 5A). The expiration date 630 includes data identifying the date on which the card expires 520.

Figure 6B:
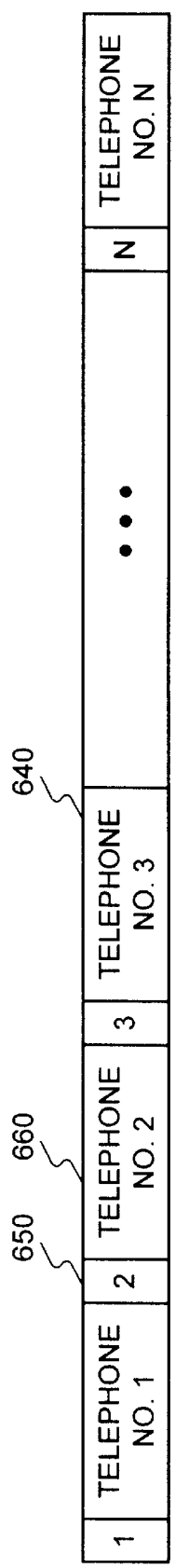

FIG. 6B is a diagram of the speed dial numbers 640. Of course, other configurations are possible. The speed dial numbers 640 include several speed dial numbers 1, 2, . . . , N. Each of the speed dial numbers includes an identifier 650 and a telephone number 660.

The identifier 650 stores a number that provides an order to the speed dial numbers. The identifier 650 permits the caller to enter a single digit or a couple of digits to dial a telephone number. The number stored in the identifier 650 reflects the digit or digits. The telephone number 660 stores the telephone number dialed by the telephone 110 when the caller enters the corresponding identifier 650. This telephone number is usually one that the caller frequently dials.

The exact number of speed dial numbers 640 that may be encoded on the magnetic strip is unimportant. Known compression techniques may be used to increase the number of speed dial numbers.

Because credit card issuers do not want the card identifier 610, card number 620, and expiration date 630 encoded on the magnetic strips of their cards to be altered, this information may be encrypted. Any known encryption technique may be used. The speed dial numbers 640 may also be encrypted, but need not be if an authorization mechanism, such as a password, a personal identification number (PIN), a retinal or fingerprint scanner, a voice recognition device, or some other biometric or non-biometric verification system, is used to regulate access to these numbers.

In an alternative implementation consistent with the present invention, the card 500 includes two magnetic strips: a first strip containing the card identifier 610, the card number 620, and the expiration date 630; and a second strip containing the speed dial numbers 640.

Exemplary Call Processing

Figure 7A:
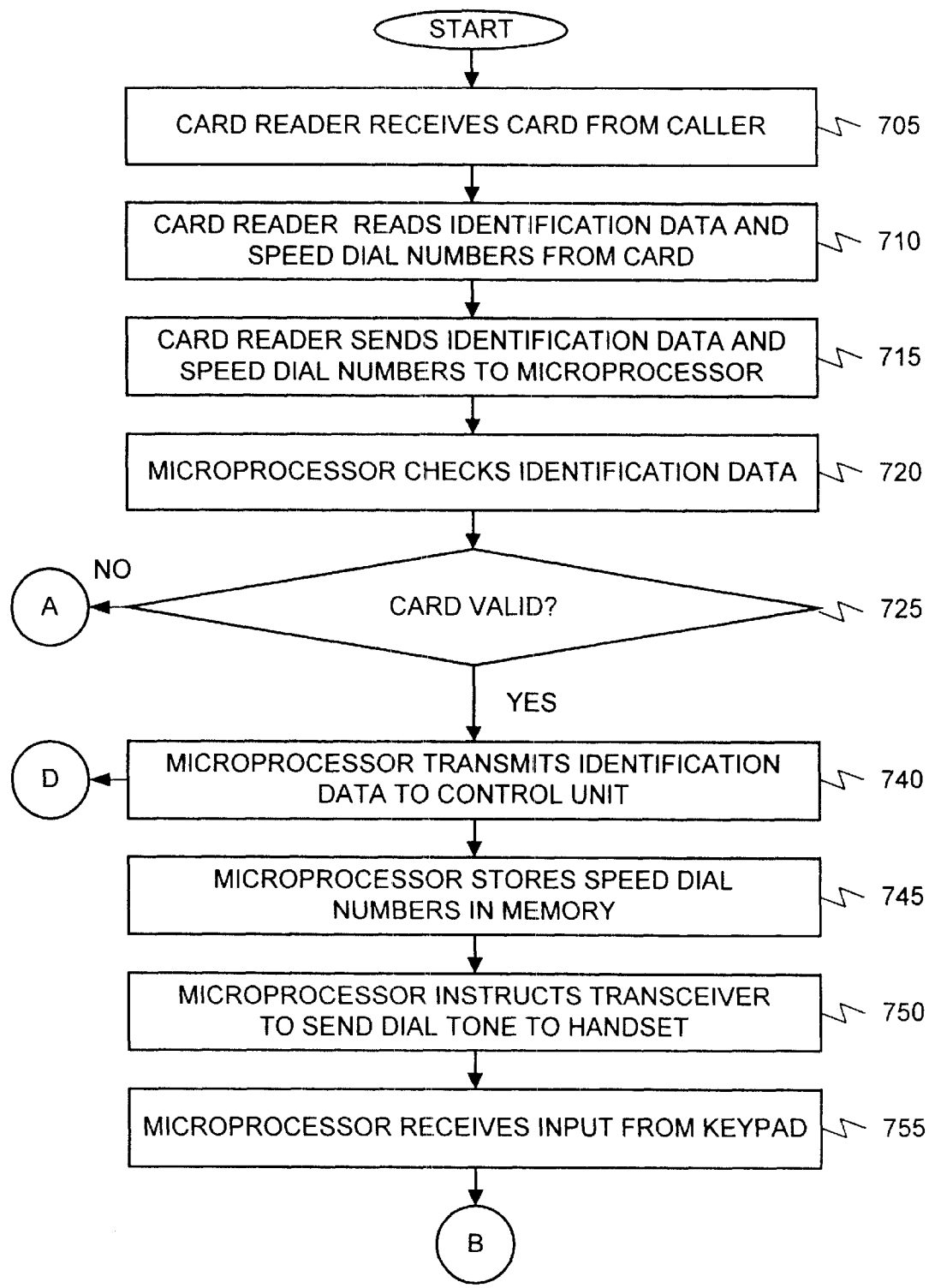
FIGS. 7A, 7B, and 7C are flowcharts of call processing consistent with the present invention.
Figure 7B:
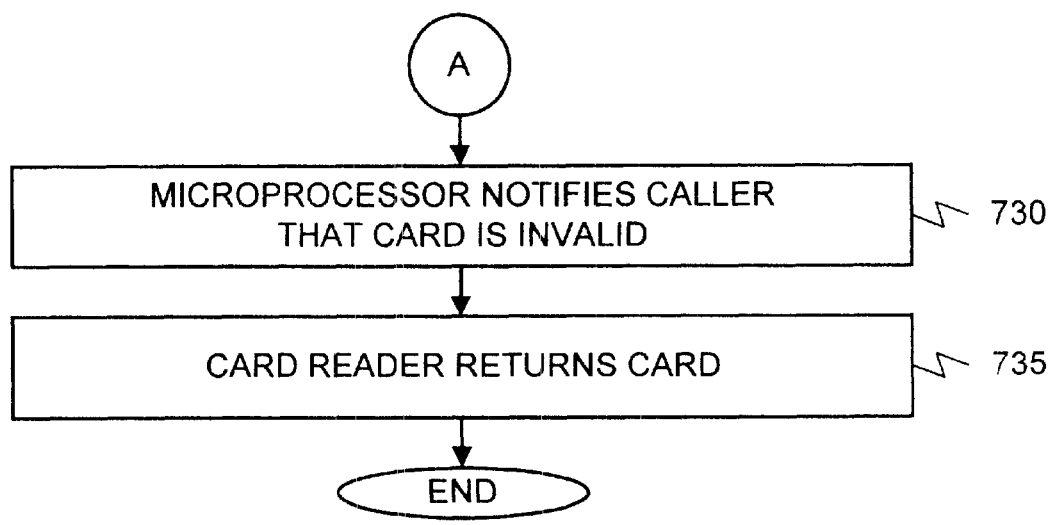
Figure 7C:
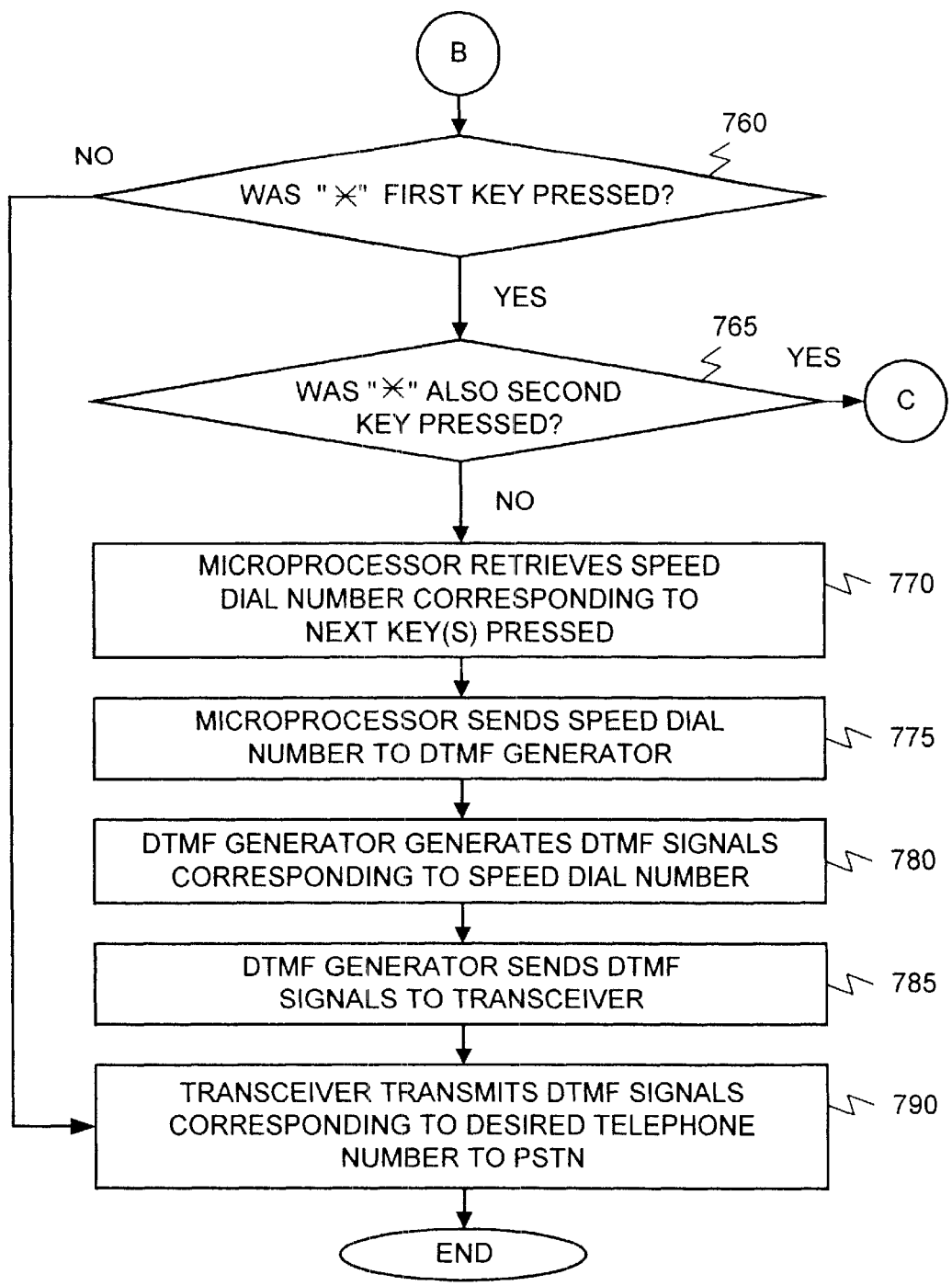

FIGS. 7A–7C are flowcharts of call processing consistent with the present invention. Although a series of steps is provided, the order of the steps does not matter.

When a caller desires to place a telephone call using one of the public telephones 110, the caller inserts a card, such as the card 500, into the card reception slot 240. The card reader/writer 380 accepts the card 500 from the caller [step 705] (FIG. 7A). The card sensor 430 (FIG. 4) detects the presence of the card 500 and sends a signal indicating so to the controller 410. In response, the controller 410 sends a signal to the rollers 420 to move the card 500 to the read head 440. Once the rollers 420 move the card 500 to the proper position, the read head 440 reads the information encoded on the magnetic strip 540 (FIG. 5B), such as the card identifier 610, the card number 620, the expiration date 630, and the speed dial numbers 640 (FIG. 6A) [step 710].

The card reader/writer 380 sends the information read from the card 500 to the microprocessor 310 (FIG. 3) [step 715]. The microprocessor 310 performs initial tests on the card 500 [step 720]. The tests include comparing the card identifier 610 with the types of acceptable cards stored in the memory 320 and determining whether the card 500 has expired based on its expiration date 630.

If the card 500 fails either of these initial tests [step 725], the microprocessor 310 notifies the caller that the card 500 is invalid [step 730] (FIG. 7B). The microprocessor 310 may make the notification via an audible message transmitted to the caller through the handset 210 using a voice generator (not shown) or via a visible message on a display located on the telephone 110 (also not shown). The microprocessor 310 then instructs the card reader/writer 380 to return the card 500. In response, the controller 410 instructs the rollers 420 to move the card 500 to the card reception slot 240 [step 735].

If the card 500 passes both of the initial tests [step 725], the microprocessor 310 transmits the card number 620 to the control unit 130 (FIG. 1), along with its own identifier [step 740]. The microprocessor 310 then temporarily stores the speed dial numbers 640 in the memory 320 [step 745]. The speed dial numbers remain in the memory 320 only for the duration of the call process, at which point they are erased to prevent access by a subsequent caller.

After storing the speed dial numbers or concurrently therewith, the microprocessor 310 instructs the transceiver 360 to transmit a notification signal, such as a dial tone, to the handset 210 [step 750]. The dial tone informs the caller to input the desired telephone number or speed dial number. The caller does so using the keypad 230. The DTMF signals generated by the caller's input goes to both the transceiver 360 and the DTMF detector 340.

The microprocessor 310 receives the input from the keypad 230 via the DTMF detector 340 [step 755] and determines which keys the caller pressed. To activate speed dialing, the caller first presses a designated key, such as the "*" key. If the microprocessor 310 determines that the caller pressed the "*" key first [step 760] (FIG. 7C), the microprocessor 310 determines which key(s) were next pressed. To activate speed dial writing, the caller might press the "*" key a second time. Of course, other mechanisms might be used to activate the speed dialing and speed dial writing processes. For example, the microprocessor 310 might display the speed dial numbers on a display (not shown) to facilitate selection and/or editing by the caller.

If the microprocessor 310 determines that the second key pressed was not the "*" key [step 765], the microprocessor 310 uses the next key(s) to determine which speed dial number to retrieve from the memory 320. The microprocessor 310 finds the identifier 650 matching the next key(s) pressed by the caller, and retrieves the telephone number 660 corresponding to the identifier 650 [step 770].

The microprocessor 310 sends the telephone number 660 to the DTMF generator 350 [step 775]. The DTMF generator 350 generates DTMF signals corresponding to the telephone number 660 [step 780] and transmits them to the transceiver 360 [step 785]. The microprocessor 310 instructs the transceiver 360 to transmit the DTMF signals from the DTMF generator 350 to the PSTN 120. The transceiver 360 does so to place the telephone call using the speed dial number [step 790].

If, on the other hand, the microprocessor 310 determines that the "*" key was not the first key pressed by the caller [step 760], the microprocessor 310 instructs the transceiver 360 to transmit the DTMF signals from the keypad 230 to the PSTN 120. The transceiver 360 does so to place the telephone call using the telephone number entered by the caller [step 790].

Exemplary Speed Dial Writing Process

Figure 8:
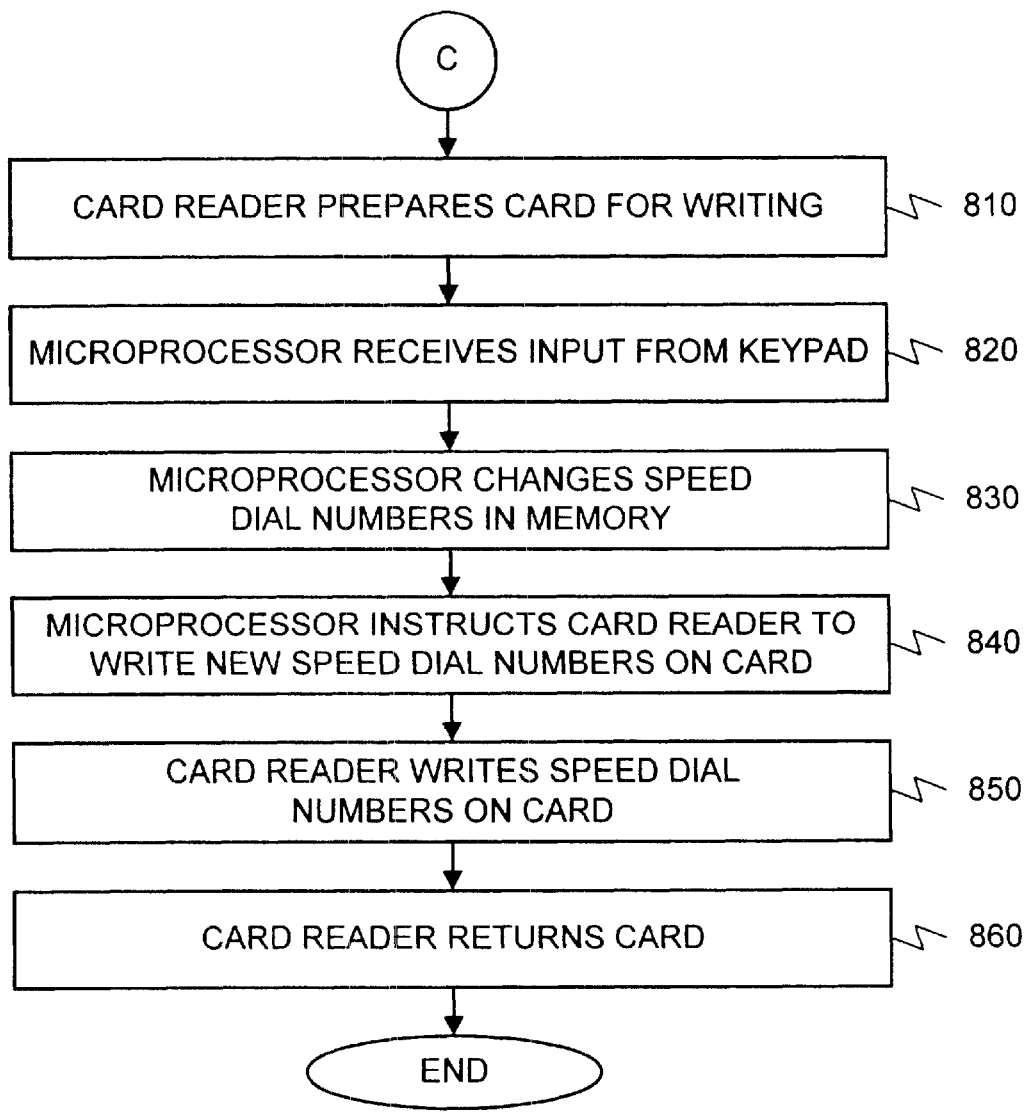
FIG. 8 is a flowchart of a speed dial writing process consistent with the present invention.

FIG. 8 is a flowchart of a speed dial writing process consistent with the present invention. If the microprocessor 310 determines that the second key pressed was the "*" key in step 765 of FIG. 7C, the microprocessor 310 may provide audible speed dial writing instructions to the caller via the handset 210. At this point, the microprocessor 310 might also instruct the caller to enter a password or PIN or submit to some biometric or non-biometric verification process.

In the case of speed dial writing, the card reader/writer 380 prepares the card 500 for writing [step 810]. To accomplish this, the controller 410 within the card reader/writer 380 sends a signal to the rollers 420 to move the card 500 to the write head 450.

Following the operating instructions, the caller enters the speed dial numbers for storage on the card 500. The microprocessor 310 receives the input from the keypad 230 [step 820] and stores the speed dial numbers in the memory 320 [step 830].

When the caller completes the desired changes, the microprocessor 310 instructs the card reader/writer 380 to store the speed dial numbers on the card 500 [step 840]. In response, the controller 410 instructs the write driver 455 to write the data onto the magnetic strip 540 of the card 500 using the write head 450 [step 850]. When the write head 450 completes the writing operation, the controller 410 instructs the rollers 420 to return the card to the caller by moving the card 500 to the card reception slot 240 [step 860].

Exemplary Call Verification Processing

Figure 9:
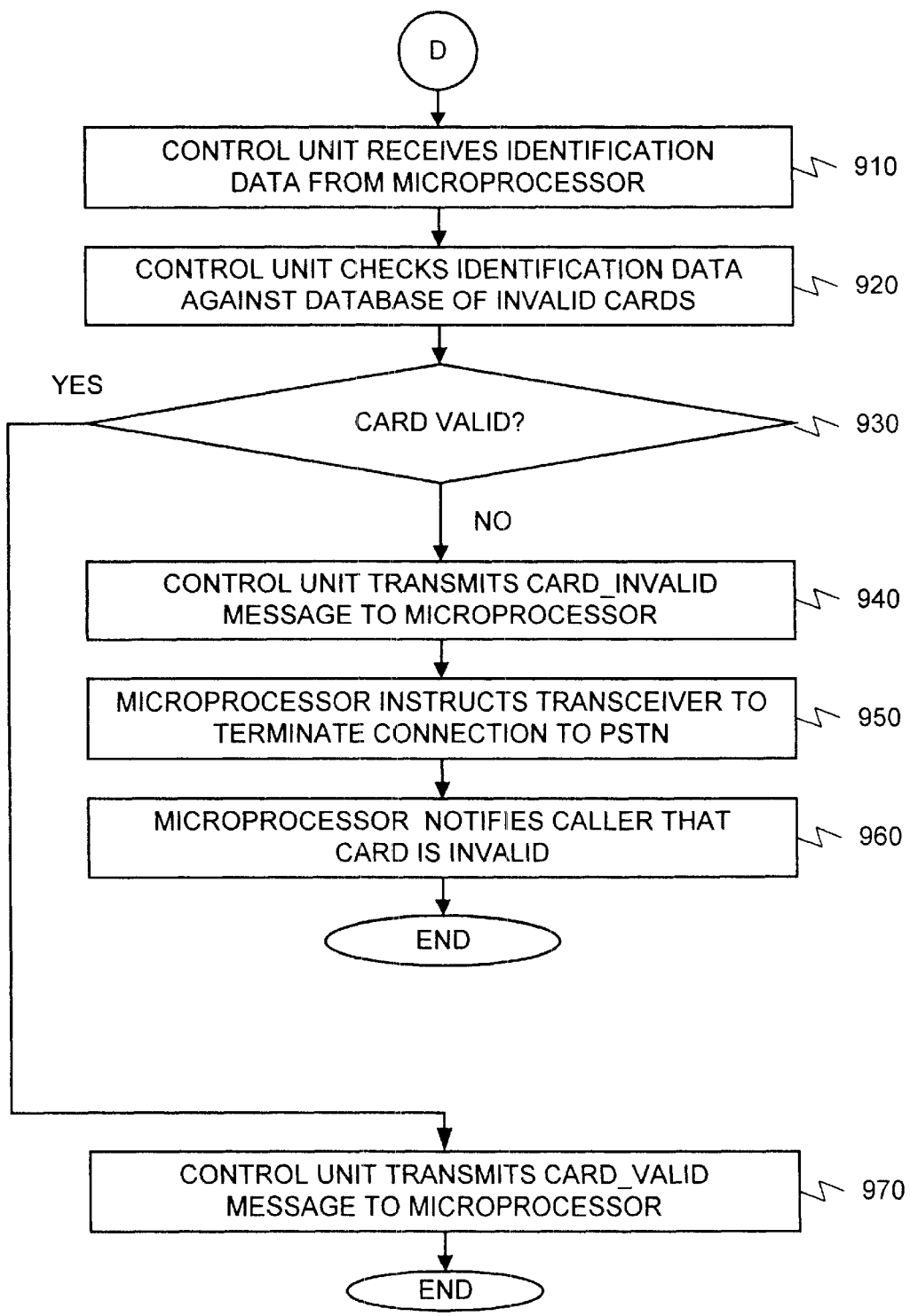
FIG. 9 is a flowchart of call verification processing consistent with the present invention.

FIG. 9 is a flowchart of call verification processing consistent with the present invention. When the card 500 passes the initial tests performed by the microprocessor 310, the microprocessor 310 transmits the card number 620 to the control unit 130, along with its own identifier (step 740 in FIG. 7A). The control unit 130 receives the card number 620 and telephone identifier [step 910] and checks the card number 620 against a database of invalid card numbers [step 920]. The control unit 130 frequently updates the database to maintain a current list of invalid card numbers.

If the card number 620 matches one of the invalid card numbers [step 930], the control unit 130 transmits a CARD_INVALID message to the microprocessor 310 [step 940]. In response, the microprocessor 310 instructs the transceiver 360 to immediately terminate the connection to the PSTN 120 [step 950], and notifies the caller that the card is invalid [step 960]. The microprocessor 310 may make the notification via an audible message transmitted to the caller through the handset 210 using a voice generator (not shown) or via a visible message on a display located on the telephone 110 (also not shown).

If the card number 620 does not match any of the invalid card numbers [step 930], the control unit 130 transmits a CARD_VALID message to the microprocessor 310 [step 970]. In this case, the call processing operations of FIGS. 7A–7C occur as previously described.

As should be apparent from the foregoing description, the control unit 130 performs its validity check concurrently with the microprocessor 310 placing the call for the caller. In other words, the microprocessor 310 does not wait for the validity determination from the control unit 130, but operates under an assumption that the caller's card is valid.

Exemplary Call Billing Process

Figure 10:
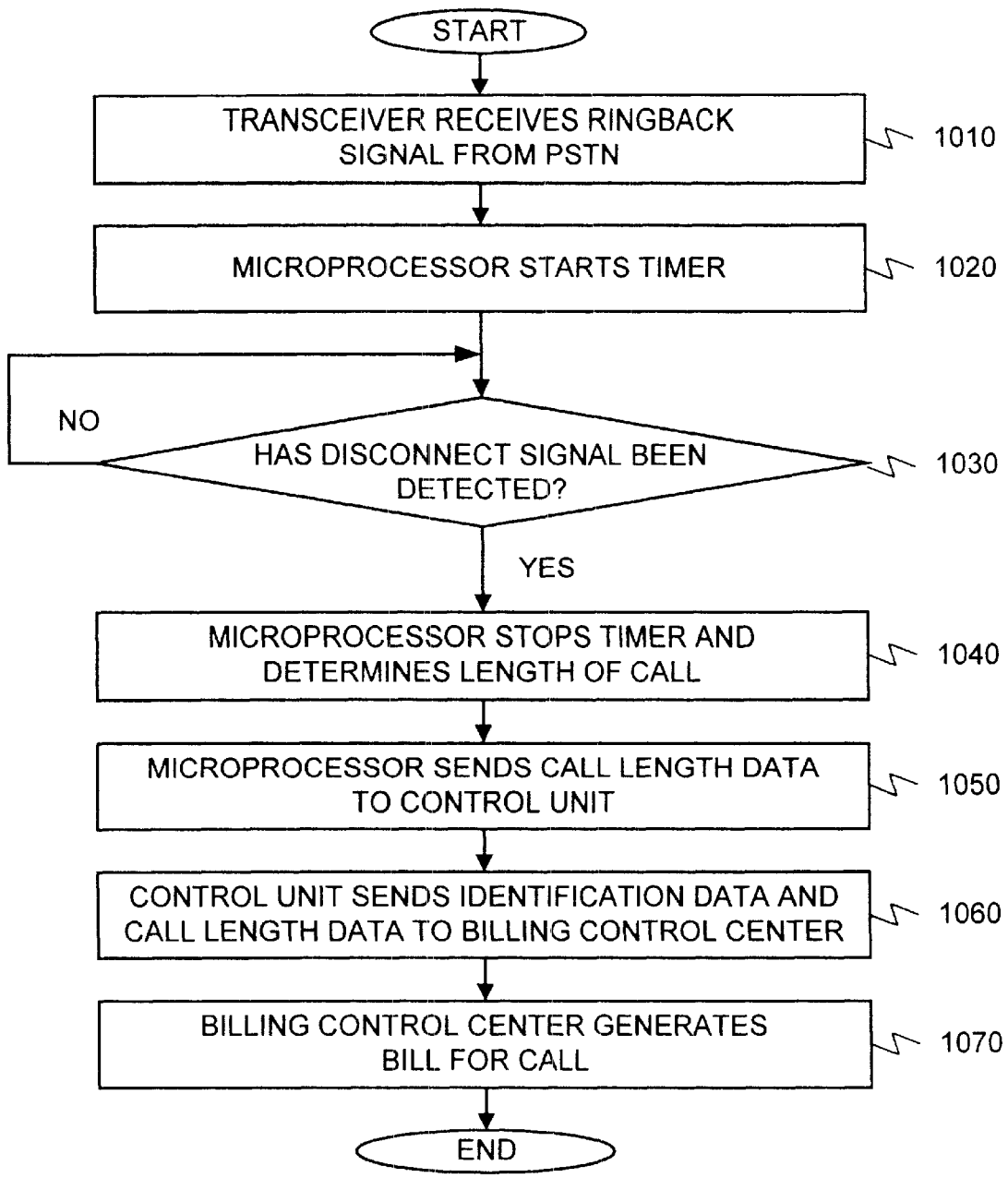
FIG. 10 is a flowchart of a call billing process consistent with the present invention.

FIG. 10 is a flowchart of a call billing process consistent with the present invention. When a caller enters the desired telephone number using the keypad 230, the transceiver 360 transmits DTMF signals representing the telephone call to the PSTN 120 (step 785 in FIG. 7C). The PSTN 120 routes the call to its destination and then sends back a ringback signal. The transceiver 360 receives the ringback signal [step 1010] and transmits a ringing signal to the handset 210 to inform the caller that the called party's telephone is ringing. When the called party answers, the transceiver 360 detects the answer signal through termination of the ringback signal from the PSTN 210, and informs the microprocessor 310.

The microprocessor 310 starts the timer 330 [step 1020] and awaits receipt of a disconnect signal indicating termination of the telephone call [step 1030]. When the microprocessor 310 receives the disconnect signal from the transceiver 360, it stops the timer 330 and determines the length of the call [step 1040]. The microprocessor 310 sends the call length data to the control unit 130, along with its own identifier [step 1050].

The control unit 130 transmits the call length data and the card number 620 to the billing control center 140 [step 1060]. The control unit 130 may make the transmission at periodic intervals during the day or may do so during non-peak hours when the use of public telephones is minimal. The billing control center 140 collects the information from the control unit 130 and generates a bill for the call [step 1070].

Exemplary Public Telephone with no Card Writer

The public telephones have been previously described as having a card reader/writer to facilitate writing of speed dial numbers on a card. Other mechanisms may provide this service, however, and these mechanisms may or may not be an integral part of the public telephone. For example, a handheld device, such as a personal digital assistant (PDA), a personal computer, or a dedicated stationary computer device could be used to program the card with the speed dial numbers. In these cases, the public telephones include elements similar to those shown in FIG. 3, except that the card reader includes no mechanisms for altering the data on the card.

To ensure the security of data stored on a card, such as a credit card, the card issuer in one implementation consistent with the present invention writes the speed dial numbers onto the card. In this case, the caller might request that particular speed dial numbers be stored on a card when the caller first requests the card. The caller might make this request via telephone or through interaction with the card issuer over a data network, such as the Internet. For example, the caller might go to the card issuer's web site using conventional web browsing software.

Figure 11C:
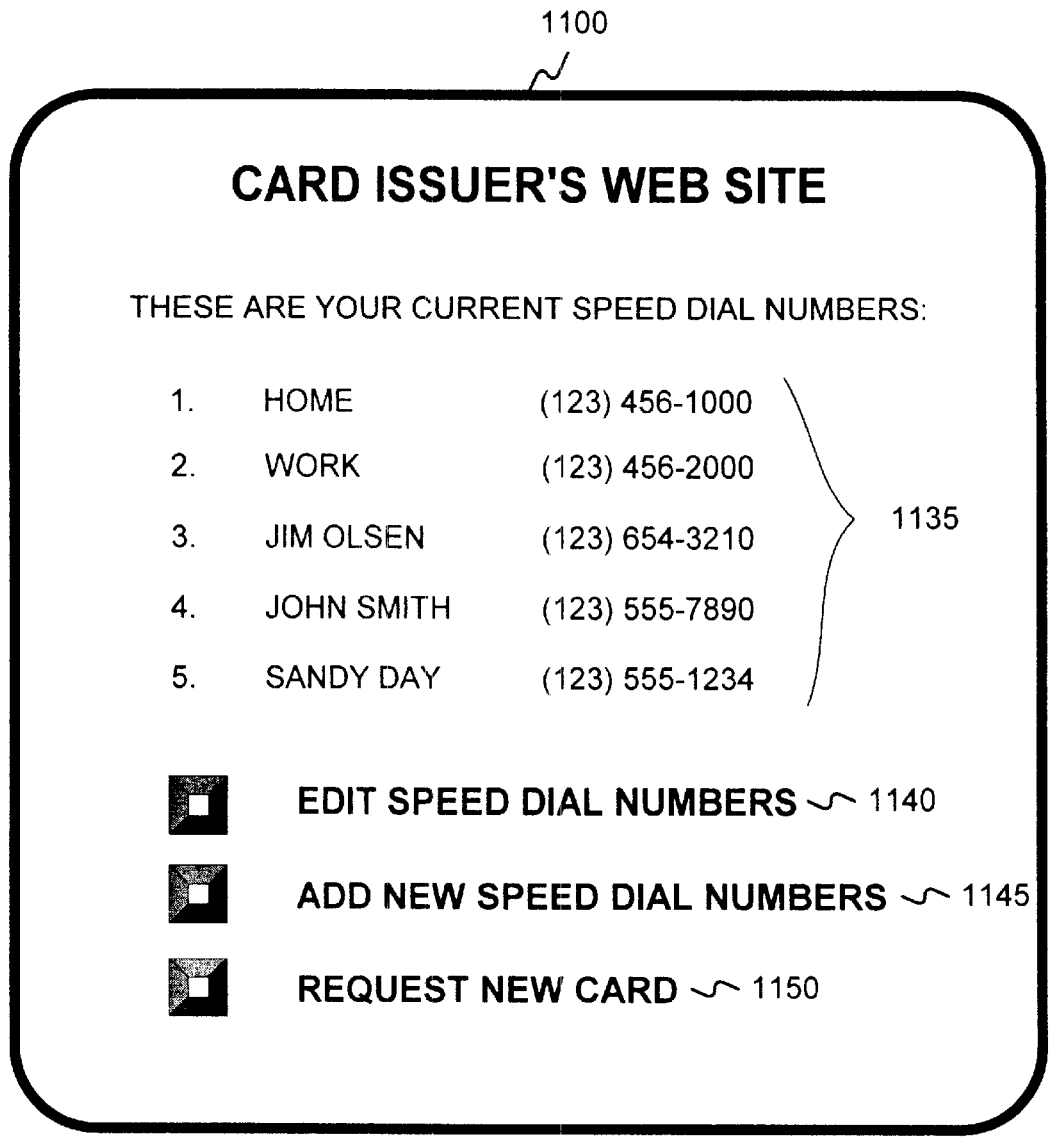

FIGS. 11A–11C are diagrams of exemplary web pages with which a caller might interact to change speed dial numbers stored on the caller's card. At the issuer's web site 1100 (FIG. 11A), the caller might be presented with a number of options for selection. If the caller is not already a cardholder, the caller might select "Request a Card" 1105. In this case, the caller might be asked for personal information, such as information regarding the caller's address, telephone number, and income.

If the caller is already a cardholder, the caller might select "Member Log In" 1110. At this point, the caller might be requested to enter a unique identifier and password or submit to some biometric or non-biometric verification to log in. If the caller successfully logs in, the caller might be presented with several options (FIG. 11B), such as "Change PIN" 1115, "Change Mailing Address" 1120, "Report Lost/Stolen Card" 1125, and "Change Speed Dial Numbers" 1130.

If the caller selects "Change PIN" 1115, the caller may change the PIN associated with the caller's card. If the caller selects "Change Mailing Address" 1120, the caller may change the address by which the issuer contacts the caller. If the caller selects "Report Lost/Stolen Card" 1125, the caller may report lost or stolen cards to inactivate the caller's account.

If the caller selects "Change Speed Dial Numbers" 1130, the caller might be presented with a list of speed dial numbers 1135 (FIG. 11C) currently stored on the caller's card and several options 1140–1150. To edit or delete speed dial numbers already stored on the card, the caller selects "Edit Speed Dial Numbers" 1140. To add new speed dial numbers, the caller selects "Add New Speed Dial Numbers" 1145. Once the caller is satisfied with the speed dial numbers, the caller selects "Request New Card" 1150 to request a new card from the issuer that contains the desired speed dial numbers. The card issuer then issues a new card that contains the speed dial numbers requested by the caller and sends it to the caller.

CONCLUSION

The systems and methods consistent with the present invention provide expedited call throughput in a public telephone by sending the call through without waiting to validate the caller's method of payment and by offering speed dialing capability.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the foregoing description described the speed dial numbers as being stored on a card. Alternatively, the telephone service provider may maintain a database of speed dial numbers. In this case, the public telephone notifies the telephone service provider of the identity of the caller based on information from the caller's card and/or from biometric or non-biometric verification systems. The provider then transmits the speed dial numbers to the public telephone for selection and/or editing by the caller.

In addition, the card has been described as storing a card identifier, a card number, an expiration date, and speed dial numbers. For added security, the card may additionally contain a voice impression of the card holder. The voice impression may be digitized and compressed to minimize its size. In this case, the public telephone may sample the caller's voice to compare it with the voice impression stored on the card.

If the voice sample fails to match the voice impression, the public telephone might take another sample, or several samples, before determining that the caller is not the card holder. In such a case, the telephone might transfer the caller to an operator for verification. The telephone performs this verification as part of the initial tests performed by the microprocessor or as part of the call verification processing.

What is claimed is:

1. A pay telephone comprising:

a keypad that generates input signals;

a card reader that reads identification data and speed dial numbers from a card; and a processor that receives the input signals from the keypad and the identification data and speed dial numbers from the card reader, and that concurrently validates the card using the identification data and initiates a telephone call based on at least one of the input signals and the speed dial numbers.

2. The pay telephone of claim 1, wherein the processor includes:

means for identifying the input signals generated by the keypad, and means for initiating the telephone call using one of the speed dial numbers when at least one of the input signals is identified as a predetermined input signal.

3. The pay telephone of claim 2, further comprising:

a tone generator that generates tones indicative of a telephone number; and wherein the means for initiating the telephone call includes:

means for instructing the tone generator to generate tones reflecting a telephone number corresponding to the speed dial number for the telephone call.

4. The pay telephone of claim 1, wherein the card reader includes:

a read head that reads the identification data and the speed dial numbers from the card.

5. The pay telephone of claim 4, wherein the card reader further includes:

a write head that writes at least one speed dial number on the card.

6. The pay telephone of claim 5, wherein the processor includes:

means for identifying the input signals generated by the keypad, and means for instructing the card reader to write the at least one speed dial number on the card, using the write head, when at least one of the input signals is identified as a predetermined input signal.

7. The pay telephone of claim 1, further comprising:

a device that writes at least one speed dial number on the card.

8. The pay telephone of claim 1, wherein the card includes a memory that stores the identification data and the speed dial numbers.

9. The pay telephone of claim 1, wherein the card is one of a credit card, a debit card, and an integrated circuit card.

10. The pay telephone of claim 1, wherein the card includes:

a memory that stores the identification data as encrypted data, and a memory that stores the speed dial numbers as unencrypted data.

11. The pay telephone of claim 1, wherein the card includes a memory that stores a voice impression.

12. The pay telephone of claim 11, wherein the processor includes:

means for sampling a voice signal during the telephone call, means for comparing the sampled voice signal with the voice impression stored on the card, and means for terminating the telephone call when the sampled voice signal fails to match the voice impression.

13. The pay telephone of claim 12, wherein the means for terminating the telephone call includes:

means for resampling the voice signal a predetermined number of times during the telephone call when the sampled voice signal fails to match the voice impression, and means for ending the telephone call when the predetermined number of resampled voice signals fails to match the voice impression.

14. A method for initiating a telephone call from a pay telephone, comprising:

receiving input signals;

reading identification data and speed dial numbers from a card; and concurrently validating the card using the identification data and initiating a telephone call based on at least one of the input signals and the speed dial numbers.

15. The method of claim 14, wherein the initiating a telephone call includes:

identifying the input signals, and placing the telephone call using one of the speed dial numbers when at least one of the inputs signals is identified as a predetermined input signal.

16. The method of claim 14, further comprising:

writing at least one speed dial number on the card.

17. The method of claim 16, wherein the writing includes:

identifying the input signals, and recording the at least one speed dial number on the card when at least one of the input signals is identified as a predetermined input signal.

18. The method of claim 14, further comprising:

sampling a voice signal during the telephone call, comparing the sampled voice signal with a voice impression stored on the card, and terminating the telephone call when the sampled voice signal fails to match the voice impression.

19. The method of claim 18, wherein the terminating the telephone call includes:

resampling the voice signal a predetermined number of times during the telephone call when the sampled voice signal fails to match the voice impression, and ending the telephone call when the predetermined number of resampled voice signals fails to match the voice impression.

20. A pay telephone comprising:

means for receiving input signals;

means for reading identification data and speed dial numbers from a card; and means for concurrently validating the card using the identification data and initiating a telephone call based on at least one of the input signals and the speed dial numbers.

21. A telephone system comprising:

a billing unit that generates bills for telephone calls based on call information; and a plurality of public telephones, each of the public telephones including
a keypad that receives input signals,
a card reader that reads identification data and speed dial numbers from a card, and a processing unit that receives the input signals from the keypad and the identification data and speed dial numbers from the card reader, that concurrently validates the card using the identification data and initiates a telephone call based on at least one of the input signals and the speed dial numbers, and that transmits the call information to the billing unit.

22. The telephone system of claim 21, further comprising:

a control unit that generates validity data for the card; and wherein the processor includes:
means for validating the card using the validity data from the control unit.

23. The telephone system of claim 22, wherein the processor further includes:

means for terminating the telephone call when the processor determines that the card is invalid.

24. The telephone system of claim 21, wherein the processor includes:

means for determining whether the card passes at least one initial test, and means for initiating the telephone call only when the card passes the at least one test.

25. The telephone system of claim 21, wherein the card reader includes:

a write head that writes at least one speed dial number on the card.

26. The telephone system of claim 21, further comprising:

a device that writes at least one speed dial number on the card.

27. The telephone system of claim 21, wherein the card includes a memory storing the identification data and the speed dial numbers.

28. The telephone system of claim 21, wherein the card is one of a credit card and a debit card.

29. The telephone system of claim 21, wherein the card includes:

means for storing the identification data as encrypted data, and means for storing the speed dial numbers as unencrypted data.

30. A public telephone comprising:

an input unit that receives input signals;

a card reader that reads speed dial numbers from a credit or debit card;

a card writer that writes speed dial numbers onto a credit or debit card; and a processing unit that identifies the input signals from the input unit, that instructs the card writer to write at least one of the speed dial numbers onto the credit or debit card when at least one of the input signals is identified as a first predetermined input signal, and that initiates a telephone call using at least one of the speed dial numbers from the card reader when at least one of the input signals is identified as a second predetermined input signal.

31. The public telephone of claim 30, wherein the card reader and the card writer comprise a single card reader/writer unit.

32. The public telephone of claim 30, wherein the card writer includes a device external to the public telephone.

33. The public telephone of claim 30, wherein the credit or debit card includes a memory storing the identification data and the speed dial numbers.

34. The public telephone of claim 30, wherein the credit or debit card includes:

a first memory that stores the identification data as encrypted data, and a second memory that stores the speed dial numbers as unencrypted data.

35. The public telephone of claim 30, wherein the identification data includes:

a card identifier that identifies a type of the credit or debit card, a card number that uniquely identifies the credit or debit card, and an expiration date that identifies a date upon which the credit or debit card expires.

36. In a system having a control unit that generates validity data for a card, a billing unit that generates bills for telephone calls based on call information, and a plurality of pay telephones, each of the pay telephones comprising:

a keypad that receives input signals;

a card reader that reads identification data and speed dial numbers from a card; and a processing unit that receives the input signals from the keypad and the identification data and speed dial numbers from the card reader, that sends the identification data to the control unit, that concurrently validates the card using the validity data from the control unit and initiates a telephone call based on at least one of the input signals and the speed dial numbers, and that transmits the call information to the billing unit.

37. An article of manufacture used in a public telephone system, comprising:

computer usable code representing a type of card;

computer usable code representing a card identifier;

computer usable code representing an expiration date of the card; and computer usable code representing speed dial telephone numbers.

38. The article of manufacture of claim 37, further comprising:

computer usable code representing a voice impression.

39. An article of manufacture for use in a pay telephone system, comprising:

encrypted computer usable code including a card identifier that identifies a type of card, a card number that uniquely identifies the card, an expiration date that identifies a date upon which the card expires; and unencrypted computer usable code including a plurality of speed dial numbers, each of the speed dial numbers having an identifier and a corresponding telephone number.

40. The article of manufacture of claim 37, further comprising:

a first memory configured to store the computer usable code representing the type of card, the computer usable code representing the card identifier, and the computer usable code representing the expiration date of the card; and a second memory configured to store the computer usable code representing the speed dial telephone numbers.

41. The article of manufacture of claim 39, further comprising:

a first memory configured to store the encrypted computer usable code; and a second memory configured to store the unencrypted computer usable code.

* * * * *